United States Patent
Seta et al.

(10) Patent No.: US 6,420,021 B1
(45) Date of Patent: Jul. 16, 2002

(54) PROPYLENIC COPOLYMER, AND ITS FILM

(75) Inventors: Yasushi Seta; Satoshi Nakatsuka, both of Ichihara; Michihiro Sawada, Himeji; Ryoichi Tsunori, Ichihara; Tokutaro Kimura, Ichihara; Yutaka Minami, Ichihara, all of (JP)

(73) Assignee: Idemitsu Petrochemical Co., Ltd. (JP)

( * ) Notice: Subject to any disclaimer, the term of this patent is extended or adjusted under 35 U.S.C. 154(b) by 0 days.

(21) Appl. No.: 09/717,223

(22) Filed: Nov. 22, 2000

Related U.S. Application Data

(62) Division of application No. 08/950,187, filed on Oct. 14, 1997.

(30) Foreign Application Priority Data

Oct. 30, 1996 (JP) .............................................. 8-288052
Nov. 25, 1996 (JP) .............................................. 8-313211

(51) Int. Cl.$^7$ ........................ B32B 27/08; C08F 210/06
(52) U.S. Cl. .................... 428/348; 428/34.9; 428/35.2; 428/35.7; 526/348
(58) Field of Search ............................... 428/34.9, 35.2, 428/35.7; 526/516, 348

(56) References Cited

U.S. PATENT DOCUMENTS

| | | | |
|---|---|---|---|
| 4,668,753 A | 5/1987 | Kashiwa et al. | 526/348 |
| 5,438,110 A | 8/1995 | Ishimaru et al. | 526/348 |
| 5,516,866 A | 5/1996 | Resconi et al. | 526/348 |
| 5,597,881 A | 1/1997 | Winter et al. | 526/348 |
| 5,618,895 A | 4/1997 | Kerth et al. | 526/348 |

FOREIGN PATENT DOCUMENTS

EP    0 341 724    11/1989

*Primary Examiner*—David W. Wu
*Assistant Examiner*—Caixia Lu
(74) *Attorney, Agent, or Firm*—Parkhurst & Wendel, LLP

(57) ABSTRACT

Disclosed are a binary random copolymer of propylene and ethylene, and a film to be formed by sheeting the copolymer. The film has good heat-sealability, high stiffness, good anti-blocking and slipping properties, and high transparency. As having excellent heat-sealability at low-temperature, the copolymer and its film are favorably used as sealant layers of laminate films.

9 Claims, No Drawings

PROPYLENIC COPOLYMER, AND ITS FILM

This is a Division of application Ser. No. 08/950,187 filed Oct. 14, 1997.

FIELD OF THE INVENTION

The present invention relates to a propylenic copolymer and its film. More precisely, the invention relates to a binary random copolymer of propylene and ethylene, and to a film to be formed by sheeting the copolymer. As having an excellent low-temperature heat-sealing property, the copolymer and its film are favorably used as sealant layers of laminate films to be produced through lamination or co-extrusion. The invention also relates to a multi-layered film as produced by laminating or co-extruding a sealant layer of the propylenic random copolymer on at least one surface of a propylenic random copolymer substrate with good stiffness.

BACKGROUND OF THE INVENTION

As having good stiffness, transparency and moisture resistance, films such as biaxially-stretched films or T die-cast films of crystalline propylene polymers are widely used as wrapping films. Wrapping films are generally formed into bags through heat sealing, and the bags are closed also through heat sealing after having been charged with contents. Therefore, for such wrapping films, preferred are multi-layered films having a sealant layer of a resin with good heat-sealability at low-temperature on their one or both surfaces, to films of propylene homopolymers with poor heat-sealability at low-temperature.

In order to improve the heat-sealability at low-temperature of propylene resins to be used for sealant layers, various techniques have heretofore been developed for copolymerizing propylene with other olefin(s) such as ethylene or α-olefins. However, most conventional techniques require copolymerization of propylene with a large amount of olefin(s) in order to make the resulting copolymers have good heat-sealability at low-temperature, resulting in that copolymers formed contain a large amount of unfavorable sticky side products which greatly lower the anti-blocking property of the copolymers. To solve this problem, known is a method of removing the sticky components by dissolving them in inert solvents. However, this method is still problematic in that the low-temperature-melting crystalline components that exist in the copolymers and are indispensable for the heat-sealability at low-temperature of the copolymers are also dissolved out of the copolymers, thus causing a condition that the heat-sealability at low-temperature of the copolymers is worsened.

On the other hand, since the resins used for such heat-sealing layers are expensive, recently used are multi-laminate films having thinner heat-sealing layers that is surface layers and therefor having higher stiffness as a whole. In such multi-laminate films, a low-temperature heat-sealing property of them depends on not only resin characteristics of heat-sealing layers but also on that of substrate layers. Therefore, the resin characteristics of substrate layers also have been tried to be improved. For example, one attempt is to copolymerize propylene with ethylene, 1-butene or the like comonomer to give resin substrate layers, which, however, is still problematic in that the copolymerization greatly lowers the crystallinity of the resins formed and therefore the resins could not have good stiffness.

In addition to their good heat-sealability at low-temperature and high strength after heat sealing, films are further required to have good slipping and anti-blocking properties in the step of re-winding the films being produced, and also to have good outward appearance and good transparency. Moreover, desired are resins capable of being formed into high-quality films even in recent high-producible, large-scale sheeting machines and high-speed sheeting machines.

On the other hand, in general, wrapping films are formed into bags through heat sealing; then the bags are charged with contents and closed also through heat sealing, and thereafter final consumers open the sealed bags to take out the contents. Thus, the process from the sheeting of those wrapping films to the end of their role takes a long time. Therefore, wrapping films are required to maintain their good quality, especially impact resistance, for the necessary period of time and under ordinary temperature conditions. Unfortunately, however, no example is known at least at present capable of satisfactorily removing the unfavorable phenomena of wrapping films, such as the reduction in their impact resistance and the reduction in their transparency.

SUMMARY OF THE INVENTION

One object of the invention is to provide a propylenic random copolymer capable of being sheeted into films having good heat-sealability at low-temperature and good slipping and anti-blocking properties necessary for high-speed sheeting of the copolymer without interfering with the intrinsic good characteristics of polypropylene films.

Another object of the invention is to provide a multi-layered film capable of exhibiting extremely high stiffness and good heat-sealability at low-temperature that are well balanced to each other, without interfering as much as possible with the intrinsic good characteristics of polypropylene films.

We, the present inventors have assiduously studied in order to attain the above-mentioned objects of the invention and, as a result, have found that, when a propylenic copolymer (A) or (B) having the specific characteristics mentioned below and containing a reduced amount of sticky components is sheeted into films, the resulting films have good slipping and anti-blocking properties and have extremely excellent heat-sealability at low-temperature.

In addition, the inventors have further found that a multi-layered laminate film comprising a substrate layer of a propylenic random copolymer (C) having the specific characteristics mentioned below, and a surface layer of the propylenic copolymer (A) or (B) having the specific characteristics mentioned below, as formed at least on one surface of the substrate layer has extremely high stiffness and good heat-sealability at low-temperature that are well balanced to each other. On the basis of these findings, we have completed the present invention.

Specifically, the invention provides a propylenic copolymer and its film, and also a multi-layered laminate film comprising the copolymer film, which are as follows:

[1] A propylenic copolymer (A) of propylene and ethylene, which satisfies the following (1) to (3):

(1) The ethylene unit content (xa, wt. %) of the copolymer is from 3 to 10 wt. %.

(2) The relation between the boiling diethyl ether extraction (Ea, wt. %) of the copolymer and xa satisfies the following (I) or (II):

$$Ea \leq 0.25xa + 1.1 (xa = 3 \text{ to } 6 \text{ wt. \%}) \qquad \text{(I)}$$

$$Ea \leq 2.6 (xa = 6 \text{ to } 10 \text{ wt. \%}) \qquad \text{(II)}$$

(3) The relation between the melting point (Tm, °C.) of the copolymer as measured with a differential scanning calorimeter and xa satisfies the following (III) or (IV):

$$Tma \leq 140 (xa=3 \text{ to } 5 \text{ wt. }\%) \qquad (III)$$

$$Tma \leq 165-5xa (xa=5 \text{ to } 10 \text{ wt. }\%) \qquad (IV)$$

[2] The propylene-ethylene copolymer (A) of [1], which further satisfies the following (4) and (5):

(4) The copolymer has a melt index (MIa, g/10 min) of from 4 to 12 g/10 min.

(5) The isotactic triad fraction (mma, mol %) in the PPP sequence of the copolymer, as measured in $^{13}$C-NMR, is not smaller than 98.0 mol %.

[3] A film as formed by sheeting the propylenic random copolymer (A) of any one of [1] or [2].

[4] A film of a copolymer of propylene and ethylene, which satisfies the following (6) to (8):

(6) The ethylene unit content (xf, wt. %) of the copolymer composing the film is from 3 to 10 wt. %.

(7) The relation between the heat of fusion of the film as measured with a differential scanning calorimeter at 120° C. or lower ($\Delta H120$, J/g) and xf satisfies the following (V) or (VI):

$$\Delta H120 \geq 14 (xf=3 \text{ to } 5 \text{ wt. }\%) \qquad (V)$$

$$\Delta H120 \geq 5xf-11 (xf=5 \text{ to } 10 \text{ wt. }\%) \qquad (VI)$$

(8) The isotactic triad fraction (mmf, mol %) in the PPP sequence of the copolymer composing the film, as measured in $^{13}$C-NMR, is not smaller than 98.0 mol %.

The invention further provides the following propylenic random copolymer and its film.

[5] A propylenic random copolymer (B) of propylene and ethylene, which satisfies the following (9) to (11):

(9) The ethylene unit content (xb, wt. %) of the copolymer is from 0.2 to 15 wt. %.

(10) The relation between the boiling diethyl ether extraction (Eb, wt. %) of the copolymer and xb satisfies the following (1) or (2):

$$Eb \leq 0.2xb+1.0 (0.2 \leq xb<5) \qquad (1)$$

$$Eb \leq 2.0 (5 \leq xb \leq 15) \qquad (2)$$

(11) The relation between the melting point (Tmb, °C.) of the copolymer as measured with a differential scanning calorimeter and xb satisfies the following (3) or (4):

$$Tmb \leq 140 (0.2 \leq xb < 4) \qquad (3)$$

$$Tmb \leq 160-5xb (4 \leq xb \leq 15) \qquad (4)$$

[6] The propylene-ethylene random copolymer (B), which further satisfies the following (12) to (14):

(12) The copolymer has a melt index (MIb, g/10 min) of from 0.1 to 15 g/10 min.

(13) The isotactic triad fraction (mmb, mol %) in the PPP sequence of the copolymer, as measured in $^{13}$C-NMR, is not smaller than 90 mol %.

(14) The relation between the PEP sequence content (R, mol %) of the copolymer as measured in $^{13}$C-NMR, and xb satisfies the following (5):

$$R \geq 0.5xb+1.0 \qquad (5)$$

[7] A film as formed by sheeting the propylenic random copolymer of any one of [5] or [6].

The invention still further provides a multi-layered film as formed through lamination of specific propylenic random copolymers.

[8] A multi-layered film of propylenic random copolymers, which comprises a surface layer of the following propylenic copolymer (A) as formed on at least one surface of a substrate layer of the following propylenic random copolymer (C):

Propylenic random copolymer (C) satisfying the following (15) to (17):

(15) The ethylene unit content (xc, wt. %) of the copolymer is from 0.2 to 4 wt. %.

(16) The relation between the boiling diethyl ether extraction (Ec, wt. %) of the copolymer and xc satisfies the following (XII):

$$Ec \leq 0.25xc+1.1 \qquad (XII)$$

(17) The relation between the melting point (Tmc, °C.) of the copolymer as measured with a differential scanning calorimeter and xc satisfies the following (XIII):

$$Tmc \leq 165-5xc \qquad (XIII)$$

Propylenic random copolymer (A) satisfying the following (1) to (3):

(1) The ethylene unit content (xa, wt. %) of the copolymer is from 3 to 10 wt. %.

(2) The relation between the boiling diethyl ether extraction (Ea, wt. %) of the copolymer and xa satisfies the following (I) or (II):

$$Ea \leq 0.25xa+1.1 (xa=3 \text{ to } 6 \text{ wt. }\%) \qquad (I)$$

$$Ea \leq 2.6 (xa=6 \text{ to } 10 \text{ wt. }\%) \qquad (II)$$

(3) The relation between the melting point (Tma, °C.) of the copolymer as measured with a differential scanning calorimeter and xa satisfies the following (III) or (IV):

$$Tma \leq 140 (xa=3 \text{ to } 5 \text{ wt. }\%) \qquad (III)$$

$$Tma \leq 165-5xa (xa=5 \text{ to } 10 \text{ wt. }\%) \qquad (IV)$$

[9] The multi-layered film of propylenic random copolymers of [8], in which the surface layer of the propylenic random copolymer (A) further satisfies the following (4) and (5):

(4) The copolymer has a melt index (MIa, g/10 min) of from 4 to 12 g/10 min.

(5) The isotactic triad fraction (mma, mol %) in the PPP sequence of the copolymer, as measured in $^{13}$C-NMR, is not smaller than 98.0 mol %.

[10] The multi-layered film of propylenic random copolymers of [8], in which the substrate layer of the propylenic random copolymer (C) further satisfies the following (18) and (19):

(18) The copolymer has a melt index (MIc, g/10 min) of from 4 to 12 g/10 min.

(19) The isotactic triad fraction (mmc, mol %) in the PPP sequence of the copolymer, as measured in $^{13}$C-NMR, is not smaller than 98 mol %.

[11] The multi-layered film of propylenic random copolymers of [9], in which the substrate layer of the propylenic random copolymer (C) further satisfies the following (18) and (19):

(18) The copolymer has a melt index (MIc, g/10 min) of from 4 to 12 g/10 min.

(19) The isotactic triad fraction (mmc, mol %) in the PPP sequence of the copolymer, as measured in $^{13}$C-NMR, is not smaller than 98 mol %.

[12] A multi-layered film of propylenic random copolymers, which comprises a surface layer of the following propylenic copolymer (B) as formed on at least one surface of a substrate layer of the following propylenic random copolymer (C):

Propylenic random copolymer (C) satisfying the following (15) to (17):

(15) The ethylene unit content (xc, wt. %) of the copolymer is from 0.2 to 4 wt. %.

(16) The relation between the boiling diethyl ether extraction (Ec, wt. %) of the copolymer and xc satisfies the following (XII):

$$Ec \leq 0.25xc + 1.1 \tag{XII}$$

(17) The relation between the melting point (Tmc, °C.) of the copolymer as measured with a differential scanning calorimeter and xc satisfies the following (XIII):

$$Tmc \leq 165 - 5xc \tag{XIII}$$

Propylenic random copolymer (B) satisfying the following (9) to (11):

(9) The ethylene unit content (xb, wt. %) of the copolymer is from 0.2 to 15 wt. %.

(10) The relation between the boiling diethyl ether extraction (Eb, wt. %) of the copolymer and xb satisfies the following (VII) or (VIII):

$$Eb \leq 0.2xb + 1.0 (0.2 \leq xb < 5) \tag{VII}$$

$$Eb \leq 2.0 (5 \leq xb \leq 15) \tag{VIII}$$

(11) The relation between the melting point (Tmb, °C.) of the copolymer as measured with a differential scanning calorimeter and xb satisfies the following (IX) or (X):

$$Tmb \leq 140 (0.2 \leq xb < 4) \tag{IX}$$

$$Tmb \leq 160 - 5xb (4 \leq xb \leq 15) \tag{X}$$

[13] The multi-layered film of propylenic random copolymers of [12], in which the surface layer of the propylenic random copolymer (B) further satisfies the following (12) to (14):

(12) The copolymer has a melt index (MIb, g/10 min) of from 0.1 to 15 g/10 min.

(13) The isotactic triad fraction (mmb, mol %) in the PPP sequence of the copolymer, as measured in $^{13}$C-NMR, is not smaller than 90 mol %.

(14) The relation between the PEP sequence content (R, mol %) of the copolymer as measured in $^{13}$C-NMR, and xb satisfies the following (XI):

$$R \geq 0.5xb + 1.0 \tag{XI}$$

[14] The multi-layered film of propylenic random copolymers of [12], in which the substrate layer of the propylenic random copolymer (C) further satisfies the following (18) and (19):

(18) The copolymer has a melt index (MIc, g/10 min) of from 4 to 12 g/10 min.

(19) The isotactic triad fraction (mmc, mol %) in the PPP sequence of the copolymer, as measured in $^{13}$C-NMR, is not smaller than 98 mol %.

[15] The multi-layered film of propylenic random copolymers of [13], in which the substrate layer of the propylenic random copolymer (C) further satisfies the following (18) and (19):

(18) The copolymer has a melt index (MIc, g/10 min) of from 4 to 12 g/10 min.

(19) The isotactic triad fraction (mmc, mol %) in the PPP sequence of the copolymer, as measured in $^{13}$C-NMR, is not smaller than 98 mol %.

[16] The multi-layered film of propylenic random copolymers of any one of [8] to [15], in which the thickness ratio of the surface layer to the substrate layer (surface layer/substrate layer) is between 0.005 and 0.5.

[17] The multi-layered film of propylenic random copolymers of any one of [8] to [15], in which the propylenic random copolymer (C) further satisfies the following (20):

(20) The relation between the melt index (MIc, g/10 min) of the copolymer and the time of relaxation (t, sec) of the copolymer as obtained through frequency dispersion measurement at a frequency $\omega_0 = 10^0$ rad/sec satisfies the following (XIV):

$$\tau \leq 0.65 - 0.025 \, MIc \tag{XIV}$$

PREFERRED MODES OF CARRYING OUT THE INVENTION

Now, the invention is described in detail hereinunder.

The propylenic copolymer (A) of the invention is obtained through copolymerization of propylene and ethylene, and satisfies the following (1) to (3):

(1) The ethylene unit content (xa, wt. %) of the propylenic copolymer (A) is from 3 to 10 wt. %, preferably from 3.5 to 9 wt. %, more preferably from 4 to 9 wt. %. If xa is less than 3 wt. %, the heat-sealing temperature of the copolymer could not be lowered satisfactorily. If, however, it is more than 10 wt. %, the stiffness of the copolymer is lowered, and the copolymer shall contain a large amount of sticky components, resulting in that its anti-blocking property tends to be worsened. (2) The relation between the boiling diethyl ether extraction (Ea, wt. %) of the copolymer and xa satisfies the following (I) or (II):

$$Ea \leq 0.25xa + 1.1 (xa=3 \text{ to } 6 \text{ wt. \%}) \tag{I}$$

$$Ea \leq 2.6 (xa=6 \text{ to } 10 \text{ wt. \%}) \tag{II}$$

If E oversteps the defined range, the anti-blocking property of the copolymer is worsened, and in addition, the heat-sealing temperature of the copolymer could not be lowered satisfactorily.

In particular, the following relation is more preferred.

$$Ea \leq 0.20xa + 1.1 (xa=3 \text{ to } 6 \text{ wt. \%}) \tag{I'}$$

$$Ea \leq 2.3 (xa=3 \text{ to } 6 \text{ wt. \%}) \tag{II'}$$

(3) The relation between the melting point (Tma, °C.) of the copolymer as measured with a differential scanning calorimeter and xa satisfies the following (III) or (IV):

$$Tma \leq 140 (xa=3 \text{ to } 5 \text{ wt. \%}) \tag{III}$$

$$Tma \leq 165 - 5xa (xa=5 \text{ to } 10 \text{ wt. \%}) \tag{IV}$$

If Tma oversteps the defined range, the heat-sealing temperature of the copolymer could not be lowered satisfactorily.

In particular, the following relation is more preferred.

$$Tma \leq 140(xa=3 \text{ to } 4 \text{ wt. \%}) \tag{III'}$$

$$Tma \leq 160-5xa(xa=4 \text{ to } 10 \text{ wt. \%}) \tag{IV'}$$

Preferably, the propylenic copolymer (A) of the invention further satisfies the following (4) and/or (5):

(4) The propylenic copolymer (A) has a melt index (MIa, g/10 min) of preferably from 4 to 12 g/10 min, more preferably from 5 to 10 g/10 min. If its MIa is lower than 4 g/10 min, the transparency and impact resistance of the film of the copolymer will often be poor. If, however, its MIa is higher than 12 g/10 min, the copolymer will often be sheeted into failed films.

(5) The isotactic triad fraction (mma, mol %) in the PPP sequence of the copolymer, as measured in $^{13}$C-NMR, is preferably not smaller than 98.0 mol %, more preferably not smaller than 98.5 mol %

If mma is smaller than 98.0 mol %, the copolymer contains a large amount of sticky components, resulting in that its anti-blocking property tends to be worsened. If so, in addition, the crystallinity of the copolymer is lowered so that its stiffness is lowered. Moreover, the melting point depression in the copolymer relative to the comonomer amount is small, resulting in that the heat-sealing temperature of the copolymer could not often be lowered satisfactorily.

The film of the propylenic copolymer (A) has good heat-sealability, high stiffness, good anti-blocking and slipping properties, and high transparency. In addition, even when the copolymer (A) is sheeted at a high sheeting speed, the quality of the film formed is lowered little.

The propylene-ethylene copolymer film of the invention which satisfies the following (6) to (8) has good heat-sealability, high stiffness, good anti-blocking and slipping properties, and high transparency. In addition, even when the copolymer is sheeted at a high sheeting speed, the quality of the film formed is lowered little. The film is suitably used as a sealant layer of laminate films.

(6) The comonomer unit content (xf, wt. %) of the copolymer composing the film is from 3 to 10 wt. %, preferably from 4 to 9 wt. %. If xf is smaller than 3 wt. %, the heat-sealing temperature of the film could not often be lowered satisfactorily. However, if xf is larger than 10 wt. %, the stiffness and the anti-blocking property of the film will be often lowered.

(7) The relation between the heat of fusion of the film as measured with a differential scanning calorimeter at 120° C. or lower (ΔH120, J/g) and xf satisfies the following (V) or (VI):

$$\Delta H120 \geq 14(xf=3 \text{ to } 5 \text{ wt. \%}) \tag{V}$$

$$\Delta H120 \geq 5xf-11(xf=5 \text{ to } 10 \text{ wt. \%}) \tag{VI}$$

If ΔH120 is lower than the defined range, the heat-sealing temperature of the film could not often be lowered satisfactorily.

In particular, preferred is the following relation:

$$\Delta H120 \geq 14(xf=3 \text{ to } 5 \text{ wt. \%}) \tag{V'}$$

$$\Delta H120 \geq 8xf-26(xf=5 \text{ to } 10 \text{ wt. \%}) \tag{VI'}$$

(8) The isotactic triad fraction (mmf, mol %) in the PPP sequence of the copolymer composing the film, as measured in $^{13}$C-NMR, is not smaller than 98.0 mol %, preferably not smaller than 98.5 mol %.

If mmf is smaller than 98.0 mol %, the film shall contain a large amount of sticky components, resulting in that its anti-blocking property will be lowered, and the crystallinity of the copolymer composing the film is lowered, meaning that the stiffness of the film will be often low. If so, in addition, the melting point depression in the film relative to the comonomer amount is small, resulting in that the heat-sealing temperature of the film could not often be lowered satisfactorily.

The propylenic random copolymer (B) of the invention is obtained through random copolymerization of propylene and ethylene, and satisfies the following (9) to (11):

(9) The ethylene unit content (xb, wt. %) of the propylenic random copolymer is from 0.2 to 15 wt. %, preferably from 3 to 10 wt. %. If xb is less than 0.2 wt. %, the heat-sealing temperature of the copolymer could not be lowered satisfactorily, and in addition, the crystallinity of the copolymer is too high. Therefore, if the copolymer is sheeted at a high sheeting speed, the resulting film will often have poor impact resistance. If, however, xb is more than 15 wt. %, the stiffness of the copolymer is lowered, and the copolymer shall contain a large amount of sticky components, resulting in that its anti-blocking property is worsened.

(10) The relation between the boiling diethyl ether extraction (Eb, wt. %) of the copolymer and xb satisfies the following (VII) or (VIII):

$$Eb \leq 0.2xb+1.0(0.2 \leq xb<5) \tag{VII}$$

$$Eb \leq 2.0(5 \leq xb \leq 15) \tag{VIII}$$

If Eb oversteps the defined range, the anti-blocking property of the copolymer is worsened, and in addition, the heat-sealing temperature of the copolymer could not be lowered satisfactorily.

In particular, the following relation is more preferred.

$$Eb \leq 0.2xb+0.5(0.2 \leq xb<5) \tag{VII'}$$

$$Eb \leq 1.5(5 \leq xb \leq 15) \tag{VIII'}$$

(11) The relation between the melting point (Tmb ° C.) of the copolymer as measured with a differential scanning calorimeter and xb satisfies the following (IX) or (X):

$$Tmb \leq 140(0.2 \leq xb<4) \tag{IX}$$

$$Tmb \leq 160-5xb(4 \leq xb \leq 15) \tag{X}$$

If Tmb oversteps the defined range, the heat-sealing temperature of the copolymer could not be lowered satisfactorily.

In particular, the following relation is more preferred.

$$Tmb \leq 155-5xb(0.2 \leq xb \leq 15) \tag{X'}$$

Preferably, the propylenic copolymer (B) of the invention further satisfies at least one of the following (12) to (14):

(12) The propylenic random copolymer has a melt index (MIb, g/10 min) of preferably from 0.1 to 15 g/10 min, more preferably from 1 to 2 g/10 min. If its MIb is lower than 0.1 g/10 min, the transparency and impact resistance of the film of the copolymer tends to be poor. If, however, its MI is higher than 15 g/10 min, the copolymer will often be sheeted into failed films.

(13) The isotactic triad fraction (mmb, mol %) in the PPP sequence of the copolymer, as measured in $^{13}$C-NMR, is preferably not smaller than 90 mol %, more preferably not smaller than 94 mol %.

If mmb is smaller than 90 mol %, the copolymer contains a large amount of sticky components, resulting in that its anti-blocking property tends to be worsened. If so, in addition, the crystallinity of the copolymer is lowered so that its stiffness is lowered. Moreover, the melting point depression in the copolymer relative to the comonomer amount is small, resulting in that the heat-sealing temperature of the copolymer could not often be lowered satisfactorily.

(14) The relation between the PEP sequence content (R, mol %) of the copolymer as measured in $^{13}$C-NMR, and xb preferably satisfies the following (XI):

$$R \geq 0.5xb+1.0 \tag{XI}$$

If R is smaller than the defined range, the melting point depression in the copolymer relative to the comonomer amount is small, resulting in that the heat-sealing temperature of the copolymer could not often be lowered satisfactorily. In addition, if so, the copolymer contains a large amount of sticky components, resulting in that its anti-blocking property tends to be worsened.

In particular, more preferred is the relation satisfying the following:

$$R \geq 0.5xb+2.0 \tag{XI'}$$

The propylenic random copolymer can be sheeted into films having good heat-sealability at low-temperature and especially having good slipping and anti-blocking properties which are necessary for working the films at a high working speed, without interfering with as much as possible the intrinsic good characteristics of polypropylene films. In addition, the films of the copolymer have high transparency and good impact resistance. Even when the copolymer is sheeted at a high sheeting speed, the quality of the resulting films decrease bit little.

The propylenic random copolymer (A) and (B) of the invention can be separately formed into corresponding film having especially good heat-sealability at low-temperature. The resulting single-layered film, and even multi-layered film comprising the film of the propylenic random copolymer (A) or (B) of the invention and single-layered or multi-layered film of other resins can be used favorably for wrapping use and in other various applications. The other resins include, for example, polyolefin resins such as polypropylene resins, as well as polyester resins, ethylene-vinyl acetate copolymers (EVA), etc.

The above multi-layered films can be produced by separately preparing the substrate layer and the surface layer followed by laminating them in a known dry-laminating method, or can be produced at a time by co-extruding the each layers in a known co-extruding method.

In such a multi-layered film, it is especially advantageous that a sealant surface layer of the copolymer of the invention is laminated or co-extruded on at least one surface of the substrate layer of other resins to give multi-layered films.

Other embodiments of the multi-layered film comprising the propylenic random copolymer of the invention are mentioned hereinunder.

The invention includes multi-layered films with high heat-sealing strength, which have maintained high stiffness and increased low-temperature heat-sealing property and can be thinned to meet the recent requirements for thin films. Specifically, the invention provides a multi-layered film comprising a substrate layer of a film of a specific propylenic random copolymer (C) and a surface layer of a film of the propylenic random copolymer (A) or (B) as formed on at least one surface of the substrate layer.

The propylenic random copolymer (C) to form the substrate layer constituting the multi-layered film of the invention shall satisfy the following (15) to (17):

(15) The ethylene unit content (xc, wt. %) of the copolymer is from 0.2 to 4 wt. %, preferably from 0.5 to 3.5 wt. %. If xc is less than 0.2 wt. %, the meltability at low-temperature of the substrate layer of the copolymer is poor. In particular, where a thin surface layer is formed on the substrate layer, the heat-sealability at low-temperature of the substrate layer is especially poor. In addition, if so, the crystallinity of the copolymer is too high, resulting in that the transparency and impact strength of multi-layered film to be formed from the copolymer will be poor when the film is formed at a high sheeting speed. On the other hand, if xc is more than 4 wt. %, the stiffness of the substrate layer of the copolymer tend to be low, resulting in that the anti-blocking property of the surface layer to be formed thereon is also lowered.

(16) The relation between the boiling diethyl ether extraction (Ec, wt. %) of the copolymer and xc satisfies the following (XII):

$$Ec \leq 0.25xc+1.1 \tag{XII}$$

If Ec oversteps the defined range, the anti-blocking property of the surface layer of the copolymer (A) to be formed over the substrate layer is poor.

Preferably;

$$Ec \leq 0.2xc+1.1 \tag{XII'}$$

(17) The relation between the melting point (Tmc, ° C.) of the copolymer as measured with a differential scanning calorimeter and xc satisfies the following (XIII):

$$Tmc \leq 165-5xc \tag{XIII}$$

If Tmc oversteps the defined range, the meltability at low-temperature of the substrate layer of the copolymer is poor. Therefore, if a thin surface layer is formed over the substrate layer, the heat-sealability at low-temperature of the resulting laminate film or co-extruded film is poor.

Preferably;

$$Tmc \leq 162-5xc \tag{XIII'}$$

Preferably, the propylenic random copolymer (C) to form the substrate layer constituting the multi-layered film of the invention additionally satisfies at least one of the following (18) to (20):

(18) The copolymer has a melt index (MIc, g/10 min) of from 4 to 12 g/10 min, preferably from 5 to 10 g/10 min.

If MIc is lower than 4 g/10 min, the transparency and the impact resistance of the layer of the copolymer will often be poor. However, if it is higher than 12 g/10 min, the copolymer will often be sheeted into failed films.

(19) The isotactic triad fraction (mmc, mol %) in the PPP sequence of the copolymer, as measured in $^{13}$C-NMR, is not smaller than 98 mol %, preferably not smaller than 98.5 mol %.

If mmc is smaller than 98 mol %, the copolymer shall contain a large amount of sticky components, resulting in that its anti-blocking property tend to be poor. In addition, since the crystallinity of the copolymer tend to be lowered, often resulting in that its stiffness is lowered. Moreover, since the melting point depression in the copolymer relative to the comonomer amount is small, often resulting in that the melting point of the layer of the copolymer could not be lowered satisfactorily.

(20) The relation between the melt index (MIc, g/10 min) of the copolymer and the time of relaxation (τ, sec) of the copolymer as obtained through frequency dispersion measurement at a frequency $\omega_0=10^0$ rad/sec satisfies the following (XIV):

$$\tau \leq 0.65 - 0.025 MIc \quad \text{(XIV)}$$

If τ oversteps the defined range, the transparency and impact resistance of the layer of the copolymer will often be poor when the copolymer is sheeted into the layer at a high sheeting speed.

In particular, more preferred is the relation satisfying the following:

$$\tau \leq 0.63 - 0.025 MIc \quad \text{(XIV')}$$

On the other hand, the surface layer of the multi-layered film is sheeted from the propylenic random copolymer (A) or (B). The propylenic random copolymer (A) or (B) satisfies the requirements (1) to (3), or the requirements (6) to (8), and preferably further satisfies the requirements (4) and (5), or the requirements (9) to (11). The propylenic random copolymer (C) is preferably different from the propylenic random copolymer (A) or (B).

Preferably, the multi-layered film of those propylenic random copolymers of the invention is such that the thickness ratio of the surface layer of the propylene-ethylene random copolymer (A) or (B) to the substrate layer of the propylenic random copolymer (C) (surface layer/substrate layer) falls between 0.005 and 0.5, more preferably between 0.01 and 0.2.

If the ratio is larger than 0.5, the stiffness of the multi-layered film will often be poor. If, however, the ratio is smaller than 0.005, the multi-layered film tend to be difficult to shape and, in addition, the multi-layered film could not often exhibit satisfactorily the heat-sealability at low-temperature of the sealant surface layer of the multi-layered film.

The propylenic copolymers (A), (B) and (C) can be produced under specific polymerization conditions in the presence of specific catalysts, for example, in the manner mentioned hereinunder. However, such specific conditions and specific catalysts are not limitative.

The catalysts usable in producing the propylenic copolymers (A), (B) and (C) comprise, for example, (a) a solid catalyst component (a) consisting essentially of magnesium, titanium and a halogen, (b) a catalyst component of an organic metal compound such as an organic aluminium compound, and (c) a catalyst component of an electron donor compound such as an organic silicon compound. Concretely, the following catalyst components are employable herein.

(a) Solid Catalyst Component

Preferred carriers for the solid catalyst component can be obtained by reacting a metal magnesium, an alcohol, and a halogen and/or a halogen-containing compound.

The metal magnesium may be in any form of granular, ribbon-like, or powdery ones. Preferably, the metal magnesium is not coated with any substance other than metal magnesium, such as magnesium oxide.

The alcohol is preferably a lower alcohol having from 1 to 6 carbon atoms, such as methanol or ethanol. Especially preferred is ethanol, as easily giving good catalysts having high activity.

The halogen is preferably chlorine, bromine or iodine. Of those, especially preferred is iodine. As the halogen-containing compound, preferably used is $MgCl_2$ or $MgI_2$.

The amount of the alcohol to be used is preferably from 2 to 100 mols, more preferably from 5 to 50 mols, per mol of the metal magnesium.

The amount of the halogen or halogen-containing compound to be used may be generally 0.0001 gram-atoms or more, preferably from 0.0005 to 0.1 gram-atoms, especially preferably from 0.001 to 0.06 gram-atoms or more, in terms of the amount of the halogen atom itself or of the amount of the halogen atom in the halogen-containing compound, relative to 1 gram-atom of the metal magnesium. One or more halogens or halogen-containing compounds can be used either singly or as combined.

The carrier of the catalyst for use in the invention can be obtained generally by reacting the metal magnesium, alcohol, and halogen and/or halogen-containing compound, for example, under reflux (at about 79° C.) until hydrogen gas is no more formed, generally for from 20 to 30 hours. This reaction is preferably effected in an inert gas atmosphere such as nitrogen gas or argon gas.

The thus-obtained carrier is filtered out and dried, optionally after having been washed with an inert solvent such as heptane, and is used in producing the solid catalyst component (a).

Preferably, the carrier is nearly granular, while having a narrow grain size distribution to give a sharp peak. More preferably, the variation in the shape of each grain constituting the carrier is as small as possible. Concretely, the sphericity (S) of each grain to be represented by the following (XV) is preferably less than 1.60, more preferably less than 1.40, and the grain size distribution index (P) to be represented by the following (XVI) is preferably less than 5.0, more preferably less than 4.0.

$$S=(E1/E1)^2 \quad \text{(XV)}$$

wherein E indicates the length of the projected border line of each grain; and E2 indicates the circumference of the circle of which the area is the same as the projected area of each grain.

$$P=D90/D10 \quad \text{(XVI)}$$

wherein D90 indicates a grain size corresponding to the weight cumulative fraction of 90%. In other words, D90 means that the weight sum of the grains having a grain size smaller than the grain size represented by D90 is 90% of the total weight sum of all grains. The same shall apply also to D10.

The solid catalyst component is produced by contacting the carrier with at least a titanium compound.

The titanium compound may be one represented by a general formula (XVII):

$$TiX^1{}_n(OR^1)_{4-n} \quad \text{(XVII)}$$

wherein $X^1$ represents a halogen atom, especially preferably a chlorine atom; $R^1$ represents a hydrocarbon group having from 1 to 10 carbon atoms, especially preferably a linear or branched alkyl group, and plural $R^1$'s, if any, may be the same or different; and n is an integer of from 0 to 4.

Concretely, the titanium compound includes $Ti(O-i-C_3H_7)_4$, $Ti(O-C_4H_9)_4$, $TiCl(O-C_2H_5)_3$, $TiCl(O-i-C_3H_7)_3$, $TiCl(O-C_4H_9)_3$, $TiCl_2(O-C_4H_9)2$, $TiCl_2(O-i-C_3H_7)_2$, $TiCl_4$. Of those, especially preferred is $TiCl_4$.

Generally, the solid catalyst component is produced by further contacting the carrier with an electron donor compound.

The electron donor compound is preferably an aromatic dicarboxylate, especially preferably di-n-butyl phthalate and di-ethyl phthalate.

While the carrier is contacted with the titanium compound and the electron donor compound, in general, it is further contacted with a halogen-containing silicon compound. The halogen-containing silicon compound is preferably silicon tetrachloride.

The solid catalyst compound can be produced in any known manner. For example, the carrier is added to a solvent along with an electron donor compound and a halogen-containing silicon compound such as those mentioned above, then a titanium compound such as that mentioned above is added thereto with stirring, and all those are reacted. The solvent is preferably an inert hydrocarbon such as pentane, hexane, heptane or octene. The electron donor compound is used generally in an amount of from 0.01 to 10 mols, preferably from 0.5 to 5 mols, per mol of the carrier in terms of the magnesium atom; and the titanium compound is used generally in an amount of from 1 to 50 mols, preferably from 2 to 20 mols, per mol of the carrier in terms of the magnesium atom. The reaction is effected by contacting the components with each other, generally at a temperature falling between 0 and 200° C. for from 5 minutes to 10 hours, preferably between 30 and 150° C. for from 30 minutes to 5 hours.

After the reaction, it is preferred that the solid catalyst component formed is washed with an inert hydrocarbon (e.g., n-hexane, n-heptane).

(b) Organic Metal Catalyst Component

Of the catalyst components, the organic metal compound is preferably an organic aluminium compound.

For this, widely used are organic aluminium compounds of the following general formula (XVIII):

$$AlR^2{}_nX^2{}_{3-n} \qquad\qquad (XVIII)$$

wherein $R^2$ represents an alkyl group having from 1 to 10 carbon atoms, a cycloalkyl group, or an aryl group; $X^2$ represents a halogen atom and is preferably a chlorine or bromine atom; and n is an integer of from 1 to 3.

Concretely, the compounds include trialkyl aluminium compounds such as trimethyl aluminium, triethyl aluminium, triisobutyl aluminium; and also diethylaluminium monochloride, diisobutylaluminium monochloride, diethylaluminium monoethoxide, ethylaluminium sesquichloride, etc. Of those, preferred are triethyl aluminium and triisobutyl aluminium. One or more of those compounds can be used either singly or as combined.

(c) Electron Donor Compound

Of the catalyst components, the electron donor compound to act on the polymerization system is preferably an organic silicon compound. Especially preferred are dicyclopentyldimethoxysilane and cyclohexylmethyldimethoxysilane.

The solid catalyst component is used in the intended polymerization, preferably after having been pre-treated. To pre-treat it, preferably, it is reacted with a small amount of propylene introduced, under the condition of the existence of the solid catalyst component, organic metal compound and an electron donor compound such as those mentioned hereinabove with stirring them. Where the solid catalyst component and so on are put into the reactor, it is preferable that those components are solved in a proper solvent before being put in to avoid the solid catalyst component from adhering to inner wall of the reactor. The solvent is preferably discharged from the reactor at the latest up to the initial stage of the reaction. Such a solvent is preferably an inert hydrocarbon such as pentane, hexane, heptane, octene or the like. The organic metal compound is used in an amount of generally from 0.01 to 10 mols, preferably from 0.05 to 5 mols, per mol of the titanium atom in the solid catalyst component; and the electron donor compound is used in an amount of generally from 0.01 to 20 mols, preferably from 0.1 to 5 mols, per mol of the titanium atom in the solid catalyst. Propylene is added to the catalyst system at a propylene partial pressure higher than an atmospheric pressure, with which the solid catalyst is pre-treated preferably at from 0 to 100° C. for from 0.1 to 24 hours. After the reaction, preferably, the pre-treated catalyst is washed with an inert hydrocarbon such as n-hexane or n-heptane.

The propylenic random copolymer of the invention is produced, for example, by feeding predetermined amounts of propylene and ethylene under the existence of the solid catalyst component, the organic metal compound and the electron donor compound all mentioned above and reacting with stirring. The solid catalyst component used in the intended polymerization is preferably put into a reactor after solving them to a proper solvent such as the above-mentioned inert hydrocarbon to avoid the solid catalyst component from adhering to the inner wall of the reactor. The solvent is preferably discharged from the reactor at latest up to the initial stage of the reaction. The polymerization generally takes place under the condition that, for example, the monomers are copolymerized generally at a propylene partial pressure not lower than an atmospheric pressure, preferably between atmospheric pressure and 40 kg/cm², and at a temperature falling between −80 and 150° C., preferably between 20 and 150° C. The organic metal compound is used generally in an amount of from 0.1 to 400 mols, preferably from 1 to 200 mols, per mol of the titanium atom in the solid catalyst component; and the electron donor compound is used generally in an amount of from 0.1 to 100 mols, preferably from 1 to 50 mols, per mol of the titanium atom in the solid catalyst.

The ethylene content of the propylenic random copolymers (A), (B) and (C) shall be changed by controlling the ethylene partial pressure and the amount of ethylene to be fed into the polymerization system; and the molecular weight of those copolymers shall be changed by controlling the amount of hydrogen to be introduced into the polymerization system.

The propylenic random copolymer (B) of the invention is obtained only when the copolymer powder obtained in accordance with the above-mentioned method is further washed with an organic solvent, which, however, is not limitative. Any other methods capable of giving the propylenic random copolymer (B) are employable. The ethylene content of the propylenic random copolymer (B) will slightly vary, depending on the condition for washing it with an organic solvent.

The organic solvent to be used for washing the propylenic random copolymer may be an inert solvent, such as heptane, hexane, cyclohexane or the like. Of those, preferred is heptane. The washing temperature varies, depending on the inert solvent used, but may be generally between 0 and 80° C., preferably between 10 and 50° C. For example, when heptane is used as the solvent, the copolymer may be washed at a temperature of 25+/−5° C. The washing may be repeated several times.

The propylenic copolymer, after having been produced in the manner mentioned hereinabove, is characterized in that its PPP sequence has a high degree of stereospecificity and can be highly randomly copolymerized with ethylene. After having been thus highly randomly copolymerized, the resulting propylenic random copolymer has high crystallinity while having a low melting point. In addition, since the degree of copolymerization of the polymer with ethylene is high, the melting point of the resulting copolymer can be effectively lowered even though the comonomer amount in the copolymer is small. Moreover, the compositional distribution of the random copolymer thus formed is narrow, and the copolymer contains a reduced amount of sticky components that cause the blocking of films of the copolymer. The sticky components in the copolymer are measured in terms of the boiling diethyl ether-soluble content of the copolymer.

The propylenic random copolymers (A), (B) and (C) of the invention can contain, if desired, any ordinary additives such as antioxidants, neutralizing agents, slipping aids, anti-blocking aids, and antistatic agents.

The propylenic random copolymers (A), (B) and (C) of the invention can be sheeted into films through T-die casting or melt extrusion. For those copolymers, preferred is a T-die casting method of sheeting the copolymer into films with a large-scale sheeting machine at a high sheeting speed. In such a T-die casting method, the copolymer can be sheeted into good films having a thickness of from 10 to 500 $\mu$m even under a high-speed sheeting condition, for example, at a film taking-up speed of 50 m/min or higher.

Now, the invention is described in more detail with reference to the following Examples, which, however, are not intended to restrict the scope of the invention.

First mentioned are the methods for determining the characteristics of resins, the method of forming films; and the methods for evaluating the quality of films.

(A) Methods for Determining the Characteristics of Resins

1) Ethylene Content of Copolymer (x(xa,xb,xc), wt. %)

To determine the ethylene content of a copolymer, the copolymer is sheeted into a film having a thickness of 300 $\mu$m under the condition mentioned below, and the absorbance of the film at 718 and 733 cm$^{-1}$ was measured with FT/IR5300 (manufactured by Nippon Bunko KK). From the absorbance thus measured, the ethylene content, x, of the copolymer was obtained in accordance with the equations mentioned below.

Sheeting Condition

Press temperature: 220° C.

Pressure at Hot press or cold press: 50 kg/cm$^2$G

Period of pre-heating: 5 min

Period of hot press: 5 min

Period of cold press: 3 min

IR Condition:

Number of integration: 20

Resolution: 4 cm$^{-1}$

Ethylene Content (x(xa, xb, xc or xf), wt. %):

$$x1=0.599\times(A733/d\cdot 1)-0.161\times(A718/d\cdot 1)$$

$$x2=0.599\times(A718/d\cdot 1)-0.161\times(A733/d\cdot 1)$$

$$x=0.809\times(x1+x2)$$

wherein;

A718 is an absorbance at 718 cm$^{-1}$;

A733 is an absorbance at 733 cm$^{-1}$;

d is 0.9; and 1 is the thickness of the sample.

2) Melt Index (MI(Mia,Mib,Mic), g/10 min)

The melt index of a copolymer was measured at a temperature of 230° C. and under a load of 2160 g, according to JIS K7210.

3) Boiling Diethyl Ether Extraction (E(Ea,Eb,Ec), wt. %)

3 g of pellets of a copolymer sample that had been ground to pass through a 1 mm $\phi$ mesh were put into a cylindrical filter, while 160 ml of an extraction solvent of diethyl ether was put into a flat bottom flask. The pellets were extracted with the solvent, using a Soxhlet's extractor, at a reflux frequency of 1 time/5 min or so for 10 hours. After the extraction, diethyl ether was recovered, using an evaporator, and then dried in a vacuum drier to have a constant weight, from which was obtained the boiling diethyl ether extraction of the sample.

4) Melting Point of Copolymer as Measured with Differential Scanning Calorimeter (Tm(Tma,Tmb, Tmc), ° C.):

Using a differential scanning calorimeter (DSC7, manufactured by Perkin-Elmer Co.), 10 mg of a copolymer sample was first melted in a nitrogen atmosphere at 230° C. for 3 minutes, and then cooled to 40° C. at a cooling rate of 10° C./min. Then, the sample was kept at 40° C. for 3 minutes, and then heated at a heating rate of 10° C./min to obtain a melting endothermic curve of the sample. The peak top of the highest peak of the curve indicates the melting point of the sample.

5) Isotactic Triad Fraction in the PPP Sequence of Copolymer and Film as Measured in $^{13}$C-NMR (mm(mma,mmb, mmc,mmf), mol %)

The isotactic triad fraction in the PPP sequence of the propylenic copolymer or the propylenic copolymer film of the invention indicates the isotactic fraction of the triad units in the PPP sequence of the copolymer molecular chains constituting the propylenic copolymer or the propylenic copolymer film, and can be obtained from the $^{13}$C-NMR spectrum of the copolymer or the film.

The fraction, mm, of a propylene homopolymer can be obtained from the following equation (XIX):

$$mm=[Imm/(Imm+Imr+Irr)]\times 100 (mol\ \%) \qquad (XIX)$$

wherein Imm, Imr and Irr each indicate the peak intensity in each of three methyl carbon regions, mm, mr and rr, respectively, in the $^{13}$C-NMR spectrum of the homopolymer sample. The mm region falls between 21.4 and 22.2 ppm of the chemical shifts; the mr region falls between 20.6 and 21.4 ppm of the chemical shifts; and the rr region falls between 19.8 and 20.6 ppm of the chemical shifts.

On the other hand, in the $^{13}$C-NMR spectrum of a propylenic random copolymer, the chemical shift of the methyl carbon in the propylene unit is influenced by the adjacent ethylene unit. Concretely, the absorption peak derived from the methyl carbon of the propylene unit existing in the EPE sequence of the copolymer appears in the rr region, while the absorption peak derived from the methyl carbon of the propylene unit existing in the center of the PPE sequence of the copolymer appears in the mr region.

The absorption peak intensity derived from the methyl carbon of the propylene unit existing in the EPE sequence corresponds to the peak intensity for T $\delta\delta$ (33.3 ppm). The absorption peak intensity derived from the methyl carbon of the propylene unit existing in the center of the PPE sequence corresponds to the peak intensity for S $\alpha\gamma$ (38.0 ppm).

To obtain the isotactic triad fraction, mm, in the PPP sequence of the propylenic random copolymer, used is the following equation (XX):

$$mm=Imm/[Imm+(Imr-S\ \alpha\gamma)+(Irr-T\delta\delta)]\times 100\ (mol\ \%) \qquad (XX)$$

The $^{13}$C-NMR spectrum of the copolymer sample was obtained, using an NMR device, JNM-EX400 Model (manufactured by Nippon Electronic Co.) under the condition mentioned below.

Sample concentration: 220 mg/3 ml of NMR solvent

NMR solvent: 1,2,4-trichlorobenzene/deuterated benzene (90/10, vol %)

Temperature: 130° C.

Pulse width: 45°

Pulse frequency: 4 seconds

Number of integration: 4000

6) PEP Sequence Content of Copolymer as Measured in $^{13}$C-NMR (R, mol %)

The PEP sequence content of the propylenic random copolymer of the invention (R, mol %) indicates the PEP sequence content relative to the triad units in the copolymer molecular chain, and is obtained from the following equation (XXI):

$$R = [I_{PEP}/S_t] \times 100 \text{(mol \%)} \quad (XXI)$$

where $$S_t = I_{EEE}/2 + I_{PEEE}/4 + I_{EPE} + I_{PPE} + I_{PPP} + I_{PEE} + I_{PEP}$$

In those, $I_{EEE}$ indicates the peak intensity of the EEE sequence, and its chemical shift is between 29.9 and 30.1 ppm; $I_{PEEE}$ indicates that of the PEEE sequence, and its chemical shift is between 30.0 and 30.5 ppm; $I_{EPE}$ indicates that of the EPE sequence, and its chemical shift is between 33.2 and 33.4 ppm; $I_{PPE}$ indicates that of the PPE sequence, and its chemical shift is between 30.8 and 31.3 ppm; $I_{PPP}$ indicates that of the PPP sequence, and its chemical shift is between 28.4 and 29.8 ppm; $I_{PEE}$ indicates that of the PEE sequence, and its chemical shift is between 27.2 and 27.6 ppm; and $I_{PEP}$ indicates that of the PEP sequence, and its chemical shift is between 24.4 and 25.0 ppm.

The $^{13}$C-NMR spectrum of the copolymer sample was obtained, using the same NMR device, JNM-EX400 Model (manufactured by Nippon Electronic Co.) under the same conditions as above.

7) Time of Relaxation ($\tau$, sec)

Using a rotary rheometer (manufactured by Rheometrics Co.), a copolymer sample as put on a Cohn plate (diameter 25.0 mm; Cohn angle 0.10 radians) was subjected to frequency dispersion at a temperature of 175° C. and at a frequency $\omega_0 = 100$ rad/sec. The time of relaxation of the sample ($\tau$, sec) was obtained as follows:

$$G^*(i\omega) = s^*/g^* = G'(\omega) + iG''(\omega)$$

where;

$G^*(i\omega)$ indicates a complex modulus of visco-elasticity of the sample, which is defined by $\sigma^*/\gamma^*$;

$\sigma^*$ indicates the stress of the sample;

$\gamma^*$ indicates the strain of the sample.

$$\tau(\omega) = G'(\omega)/\omega G''(\omega)$$

where;

$\omega$ indicates the frequency (rad/sec);

G' indicates the storage modulus of elasticity;

G" indicates the loss modulus of elasticity.

(B) Method of Forming Films:

Using a 75 mm $\phi$ sheeting machine (manufactured by Mitsubishi Heavy Industries, Ltd.), pellets of the propylenic random copolymer or those of the propylene homopolymer as obtained in the following Examples and Comparative Examples were sheeted into 30 $\mu$m-thick films under the conditions mentioned below.

Sheeting temperature: 250° C.

Chill roll temperature: 40° C.

Taking-up Speed: 125 m/min

Multi-layered films composed of a propylenic random copolymer (A) or (B) and a propylenic random copolymer (C) were produced by co-extruding the pellets of those propylenic random copolymers through a 3-layered T-die co-extrusion casting machine under the conditions mentioned below. The total thickness of the multi-layered film thus produced was 30 $\mu$m. The total amount of the copolymers extruded was 80 kg/hr. The film taking-up speed was 70 m/min. The casting machine was provided with three extruders of 50 mm $\phi$/65 mm $\phi$/40 mm $\phi$, corresponding to the structure of surface layer (1)/substrate layer/surface layer (2) of the multi-layered film being produced. The temperature of the copolymer at the die outlet was 260° C., the chill roll temperature was 23° C., and the corona processing density was 38 W/m$^2$/min.

The multi-layered films produced had any of the following two layer constitutions (a) and (b):

1) Layer Constitution (a):

(A) or (B)/(C)/(A) or (B) (=1/5/1 in thickness)

Number of screw revolutions:

surface layer (1)/substrate layer/surface layer (2)=30/130/40 (rpm)

2) Layer constitution (b):

(A) or (B)/(C)/(A) or (B) (=1/10/1 in thickness)

Number of screw revolutions:

surface layer (1)/substrate layer/surface layer (2)=20/150/25 (rpm)

(C) Methods for Evaluating the Quality of Films

To evaluate their quality, all film samples were kept at a temperature of 23+/−2° C. and at a humidity of 50+/−10% for 16 hours or longer, and then subjected to the quality tests mentioned below under the same condition with respect to the ambient temperature and humidity.

1) Heat-sealing Characteristic

The heat-sealing characteristic of each sample was measured in accordance with JIS K-1707 under the sealing conditions mentioned below. The temperature of the heat seal bar used was calibrated with a surface thermometer. After having been sealed, the sample was left at room temperature for one full day, and thereafter its peeling strength was measured at room temperature in a T-type peeling method in which the peeling rate was 200 mm/min. The heat-sealing temperature was obtained from the sealing temperature/peeling strength curve, at which the peeling strength was 300 g/15 mm.

Sealing time: 2 seconds

Sealed area: 15×10 mm

Sealing pressure: 5.3 kg/cm$^2$

Sealing temperature: several points in which the sealing temperature was interpolated.

2) Modulus of Tensile Elasticity

The modulus of tensile elasticity of each sample was measured in the tensile test of JIS K7127, under the conditions mentioned below.

Cross head speed: 500 min/min

Direction: machine direction (MD)

Load cell: 10 kg

3) Anti-blocking Characteristic

Two sheets of a film sample were kept in close contact with each other under the conditions mentioned below, and then peeled, whereupon the peeling strength was measured. The peeling strength thus measured indicates the anti-blocking characteristic of the sample.

Condition for close contact of two films:

Condition 1 for Single-layered films:

Temperature: 60° C.

Time: 3 hour

Load weight: 36 g/cm$^2$

Condition 2 for Single-layered films:
Temperature: 50° C.
Time: One week
Load weight: 15 g/cm$^2$
Condition for two Multi-layerd films:
Temperature: 60° C.
Time: 3 hour
Load weight: 36 g/cm$^2$
Condition for peeling test:
Test speed: 20 mm/min
Load cell: 2 kg
Condition for peeling test:
Test speed: 20 mm/min
Load cell: 2 kg
Surfaces for the measurement:
  1: corona treated surface/corona treated surface
  2: non-treated surface/non-treated surface
4) Slipping Characteristic:

A thread coated with a film sample was put on a glass sheet coated with the same film sample, and the glass sheet was gradually inclined whereupon the angle (θ) of the glass sheet at which the thread began to slip was measured. The data of tan θ indicates the slipping characteristic of the sample. In this was used a friction angle meter (manufactured by Toyo Seiki Seisaku-sho Co.), and the test was effected under the following conditions.

Surfaces for the measurement:
  for single-layered film:
    metal roll surface/metal roll surface
  for multi-layered film:
    1: corona treated surface/corona treated surface
    2: non-treated surface/non-treated surface
Inclining rate: 2.7°/sec
Thread weight: 1 kg
Area of cross section of thread: 65 cm$^2$
Interfacial pressure: 15 g/cm$^2$
5) Transparency (haze)

The haze of each film sample was measured according to JIS K7105, which indicates the transparency of the sample.
6) Impact Resistance Using a film impact tester (manufactured by Toyo Seiki Seisaku-sho Co.) provided with a ½ inch impact head, each film sample was tested to obtain its impact breaking strength, which indicates the impact resistance of the sample.
7) Heat of Fusion of Film as Measured with Differential Scanning Calorimeter at 120° C. or lower (ΔH120, J/g)

Using a differential scanning calorimeter (DSC7, manufactured by Perkin-Elmer Co.), 10 mg of a film sample was first kept at 25° C. in a nitrogen atmosphere for 3 minutes, and then heated at a heating rate of 10° C./min to obtain a melting endothermic curve of the sample. The heat of fusion in the area of 120° C. or lower at the maximum peak of the curve was obtained.

EXAMPLE 1

(A) Propylenic Random Copolymers
(1) Preparation of Magnesium Compound

A reactor (inner volume: 500 liters) equipped with a stirrer was fully purged with nitrogen gas, into which were put 97.2 kg of ethanol, 640 g of iodine, and 6.4 kg of metal magnesium, and reacted with stirring under reflux until hydrogen gas was no longer formed. Thus was formed a solid reaction product. The reaction mixture containing this solid product was dried under reduced pressure to obtain the intended magnesium compound (carrier of solid catalyst).

(2) Preparation of Solid Catalyst Component

A reactor (inner volume: 500 liters) equipped with a stirrer was fully purged with nitrogen gas, into which were put 30 kg of the magnesium compound (not ground), 150 liters of pure heptane (n-heptane), 4.5 liters of silicon tetrachloride, and 5.4 liters of di-n-butyl phthalate. The reaction system was kept at 90° C., into which was added 144 liters of titanium tetrachloride with stirring, and reacted at 110° C. for 2 hours. Next, the solid component was separated and washed with pure heptane at 80° C., to which was added 228 liters of titanium tetrachloride and reacted at 110° C. for 2 hours. After having been fully washed with pure heptane, a solid catalyst component was obtained.

(3) Pre-treatment 230 liters of pure heptane was put into a reactor (inner volume: 500 liters) equipped with a stirrer, into which were added 25 kg of the solid catalyst component, 1.0 mol/mol, relative to the titanium atom in the solid catalyst component, of triethyl aluminium, and 1.8 mols/mol, relative to the same, of dicyclopentyldimethoxysilane. Next, propylene was introduced into the reactor to have a propylene partial pressure of 0.3 kg/cm$^2$G, and reacted at 25° C. for 4 hours. After the reaction, the solid catalyst component was washed several times with pure heptane, and then processed with carbon dioxide for 24 hours with stirring.

(4) Polymerization

Into a polymerization reactor (inner volume: 200 liters) equipped with a stirrer, fed was the pre-treated solid catalyst component at a rate of 3 mmols/hr in terms of the titanium atom in the component, along with 4 mmols/kg-PP of triethyl aluminium and 1 mmol/kg-PP of dicyclopentyldimethoxysilane, and propylene and ethylene were fed thereinto and copolymerized at a copolymerization temperature of 80° C. and under a copolymerization pressure (total pressure) of 28 kg/cm$^2$G. In this copolymerization, the ethylene concentration in the reactor was controlled to be 2.9 mol %, while the hydrogen concentration therein was 5.6 mol %, whereby the copolymer obtained might have a predetermined ethylene content and a predetermined molecular weight.

The ethylene concentration and the hydrogen concentration were obtained through compositional analysis of the gaseous phase in the reactor according to gas chromatography.

(5) Formulation of Additives

The following additives were added to the powdery propylenic copolymer thus obtained, and the resulting mixture was kneaded and extruded out into pellets, using a kneader.

1) Antioxidants
   Irganox 1010 (Ciba-Geigy): 1000 ppm
   Irgafos 168 (Ciba-Geigy): 1000 ppm
2) Neutralizing Agent, calcium stearate: 1000 ppm
3) Anti-blocking Aid: 2000 ppm
4) Slipping Aid, erucic acid amide: 1000 ppm The resin characteristics of the pellets of the propylenic random copolymer thus obtained were evaluated according to the methods (A) mentioned above. These pellets were sheeted into films according to the method (B) mentioned above. The quality of the films were evaluated according to the methods (C) mentioned above. The data obtained are shown in Table 2 below.

EXAMPLES 2 TO 4

Propylenic random copolymers (A) of Examples 2 to 4 were produced in the same manner as in Example 1, except that the ethylene concentration and the hydrogen concentration in the copolymerization system were changed to those in Table 1 below to thereby control the ethylene content and the molecular weight of those copolymers. The resin characteristics of the propylenic random copolymer pellets obtained herein were evaluated according to the methods (A) mentioned above, and their data are shown in Table 2.

Comparative Example 1

A propylenic random copolymer was produced in the same manner as in Example 1, except that no dicyclopentyldimethoxysilane was fed into the polymerization system and that the ethylene concentration and the hydrogen concentration in the reactor were 3.4 mol % and 2.4 mol %, respectively. The resin characteristics of the thus-obtained copolymer pellets were evaluated according to the methods (A) mentioned above, and the data obtained are shown in Table 3.

Comparative Example 2

A propylenic random copolymer was produced in the same manner as in Example 1, except that diethyl phthalate was used in place of di-n-butyl phthalate, that cyclohexylmethyldimethoxysilane was used in place of dicyclopentyldimethoxysilane, and that the ethylene concentration and the hydrogen concentration in the reactor were 2.6 mol % and 3.3 mol %, respectively. The resin characteristics of the thus-obtained copolymer pellets were evaluated according to the methods (A) mentioned above, and the data obtained are shown in Table 3.

Comparative Example 3

A propylenic random copolymer was produced in the same manner as in Example 1, except that diethyl phthalate was used in place of di-n-butyl phthalate, that cyclohexylmethyldimethoxysilane was used in place of dicyclopentyldimethoxysilane, and that the ethylene concentration and the hydrogen concentration in the reactor were 2.2 mol % and 3.0 mol %, respectively. The resin characteristics of the thus-obtained copolymer pellets were evaluated according to the methods (A) mentioned above, and the data obtained are shown in Table 3.

TABLE 1

|  | Example 2 | Example 3 | Example 4 |
|---|---|---|---|
| Ethylene Concentration (mol %) | 2.0 | 2.4 | 2.8 |
| Hydrogen Concentration (mol %) | 5.3 | 5.5 | 5.6 |

Concentration: Data of compositional analysis of the gaseous phase in the reactor (according to gas chromatography).

TABLE 2

|  | Example 1 | Example 2 | Example 3 | Example 4 |
|---|---|---|---|---|
| Pellets |  |  |  |  |
| $C_2''$ Content, wt. % | 4.9 | 3.9 | 4.4 | 4.7 |
| MI, g/10 min | 5.4 | 6.7 | 5.3 | 5.6 |
| Boiling Diethyl Ether Extraction, wt. % | 2.0 | 1.8 | 2.0 | 2.1 |
| Melting Point, ° C. | 131.0 | 136.9 | 132.9 | 130.7 |
| Isotactic Triad Fraction, mol % | 99.0 | 99.1 | 99.1 | 99.0 |
| Film |  |  |  |  |
| $C_2''$ Content, wt. % | 4.9 | 3.8 | 4.5 | 4.7 |
| $\Delta H120$, J/g | 21.4 | 14.0 | 19.7 | 21.4 |
| Isotactic Triad Fraction, mol % | 99.0 | 99.0 | 99.0 | 99.1 |
| Film Quality |  |  |  |  |
| Heat-sealing Temperature, ° C. | 121 | 127 | 123 | 120 |
| Modulus of Tensile Elasticity, Mpa | 760 | 900 | 820 | 740 |
| Anti-blocking Characteristic, $N/m^2$, |  |  |  |  |
| condition 1 | 46 | 10 | 18 | 21 |
| condition 2 | 5 | 4 | 8 | 8 |
| Slipping Characteristic, $\tan\theta$ | 0.14 | 0.14 | 0.13 | 0.21 |
| Haze, % | 4.9 | 4.1 | 4.6 | 4.5 |
| Impact Resistance (film impact), KJ/m | 19 | 19 | 20 | 16 |

Notes:
Anti-blocking characteristic, condition 1: Sticky components + softness and roughness of film surface are the essential factors of controlling the anti-blocking characteristic.
Anti-blocking characteristic, condition 2: Sticky components are the essential factor of controlling the anti-blocking characteristic.

TABLE 3

|  | Comparative Example 1 | Comparative Example 2 | Comparative Example 3 |
|---|---|---|---|
| Pellets |  |  |  |
| $C_2''$ Content, wt. % | 5.9 | 4.4 | 3.6 |
| MI, g/10 min | 5.6 | 8.5 | 7.5 |
| Boiling Diethyl Ether Extraction, wt. % | 5.9 | 3.0 | 2.2 |
| Melting Point, ° C. | 134.1 | 139.2 | 141.7 |
| Isotactic Triad Fraction, mol % | 97.1 | 97.0 | 96.8 |
| Film |  |  |  |
| $C_2''$ Content, wt. % | 5.8 | 4.5 | 3.6 |
| $\Delta H120$, J/g | 16.2 | 12.6 | 11.0 |
| Isotactic Triad Fraction mol % | 97.2 | 96.9 | 96.8 |
| Film Quality |  |  |  |
| Heat-sealing Temperature, ° C. | 136 | 128 | 130 |
| Modulus of Tensile Elasticity, Mpa | 540 | 720 | 820 |
| Anti-blocking Characteristic, $N/m^2$, |  |  |  |
| condition 1 | 150 | 51 | 36 |
| condition 2 | 207 | 79 | 55 |
| Slipping Characteristic, $\tan\theta$ | 0.19 | 0.38 | 0.35 |
| Haze, % | 24.9 | 3.9 | 4.0 |
| Impact Resistance (film impact), KJ/m | 19 | 17 | 17 |

Notes:
Anti-blocking characteristic, condition 1: Sticky components + softness and roughness of film surface are the essential factors of controlling the anti-blocking characteristic.
Anti-blocking characteristic, condition 2: Sticky components are the essential factor of controlling the anti-blocking characteristic.

(B) Propylenic Random Copolymers

EXAMPLE 5

(1) Preparation of Magnesium Compound

A reactor (inner volume: 500 liters) equipped with a stirrer was fully purged with nitrogen gas, into which were put 97.2 kg of ethanol, 640 g of iodine, and 6.4 kg of metal magnesium, and reacted with stirring under reflux until hydrogen gas was no more formed. Thus was formed a solid reaction product. The reaction mixture containing this solid product was dried under reduced pressure to obtain the intended magnesium compound (carrier of solid catalyst).

(2) Preparation of Solid Catalyst Component

A reactor (inner volume: 500 liters) equipped with a stirrer was fully purged with nitrogen gas, into which were put 30 kg of the magnesium compound (not ground), 150 liters of pure heptane (n-heptane), 4.5 liters of silicon tetrachloride, and 5.4 liters of diethyl phthalate. The reaction system was kept at 90° C., into which was added 144 liters of titanium tetrachloride with stirring, and reacted at 110° C. for 2 hours. Next, the solid component was separated and washed with pure heptane at 80° C., to which was added 228 liters of titanium tetrachloride and reacted at 110° C. for 2 hours. After having been fully washed with pure heptane, a solid catalyst component was obtained.

(3) Pre-treatment 230 liters of pure heptane was put into a reactor (inner volume: 500 liters) equipped with a stirrer, into which were added 25 kg of the solid catalyst component, 1.0 mol/mol, relative to the titanium atom in the solid catalyst component, of triethyl aluminium, and 1.8 mols/mol, relative to the same, of cyclohexylmethyldimethoxysilane. Next, propylene was introduced into the reactor to have a propylene partial pressure of 0.3 kg/cm$^2$G, and reacted at 25° C. for 4 hours. After the reaction, the solid catalyst component was washed several times with pure heptane, and then processed with carbon dioxide for 24 hours with stirring.

(4) Polymerization

Into a polymerization reactor (inner volume: 200 liters) equipped with a stirrer, fed was the pre-treated solid catalyst component at a rate of 3 mmols/hr in terms of the titanium atom in the component, along with 4 mmols/kg-PP of triethyl aluminium and 0.1 mmols/kg-PP of cyclohexylmethyldimethoxysilane, and propylene and ethylene were fed thereinto and copolymerized at a copolymerization temperature of 70° C. and under a copolymerization pressure (total pressure) of 28 kg/cm$^2$G. In this copolymerization, the amount of ethylene being fed and that of hydrogen being fed were so controlled that the copolymer formed might have a predetermined ethylene content and a predetermined molecular weight. As a result of the compositional analysis of the gaseous phase in the reactor using a gas chromatographic device, the ethylene concentration and the hydrogen concentration in the reactor were 5.6 mol % and 3.2 mol %, respectively.

(5) Washing 6 liters of pure heptane was put into a reactor (inner volume: 10 liters) equipped with a stirrer, and 12 g of the propylenic random copolymer powder obtained in the above was added thereto, and washed with heptane with stirring at 25° C. and at a revolution of the stirring blade of 400 rpm for 1 hour. Then, the heptane-insoluble components were taken out through filtration. This washing operation was repeated several times, and a necessary amount of the copolymer powder was obtained.

(6) Formulation of Additives

The following additives were added to the powdery propylenic copolymer thus obtained, and the resulting mixture was kneaded and extruded out into pellets, using a kneader.

1) Antioxidants
   Irganox 1010 (Ciba-Geigy): 1000 ppm
   Irgafos 168 (Ciba-Geigy): 1000 ppm
2) Neutralizing Agent, calcium stearate: 1000 ppm
3) Anti-blocking Aid, silica compound: 2500 ppm
4) Slipping Aid, erucic acid amide: 300 ppm The resin characteristics of the pellets of the propylenic random copolymer thus obtained were evaluated according to the methods (A) mentioned above. These pellets were sheeted into films according to the method (B) mentioned above. The quality of the films were evaluated according to the methods (C) mentioned above. The data obtained are shown in Table 4 below.

EXAMPLE 6

A propylenic random copolymer (B) was produced in the same manner as in Example 5, except that di-n-butyl phthalate was used in place of diethyl phthalate, that 1 mmol/kg-PP of dicyclopentyldimethoxysilane was used in place of cyclohexylmethyldimethoxysilane, and that the ethylene concentration and the hydrogen concentration in the polymerization system were 4.5 mol % and 9.5 mol %, respectively. The data of this copolymer are shown in Table 4.

EXAMPLE 7

A propylenic random copolymer (B) was produced in the same manner as in Example 6, except that the ethylene concentration and the hydrogen concentration in the polymerization system were so controlled that the copolymer obtained might have the predetermined ethylene content and the predetermined molecular weight. The resin characteristics of the thus-obtained copolymer pellets were evaluated according to the methods (A) mentioned above, and the data obtained are shown in Table 4.

Comparative Example 4

A propylenic random copolymer was produced in the same manner as in Example 5, except that the polymerization step (4) was varied as follows: Into a polymerization reactor (inner volume: 200 liters) equipped with a stirrer, fed were 5.6 g/hr of titanium trichloride, 0.25 mols/hr of diethylaluminium chloride, and 0.01 mols/hr of Irganox 1076, and propylene and ethylene were fed thereinto and copolymerized at a copolymerization temperature of 70° C. and under a copolymerization pressure (total pressure) of 28 kg/cm$^2$G. In this copolymerization, the amount of ethylene being fed was so controlled that the copolymer formed might have a predetermined ethylene content and a predetermined molecular weight. The ethylene concentration and the hydrogen concentration in the reactor were 5.0 mol % and 5.7 mol %, respectively.

The resin characteristics of the thus-obtained copolymer pellets were evaluated according to the methods (A) mentioned above, and the data obtained are shown in Table 4.

TABLE 4

|  | Example 5 | Example 6 | Example 7 | Comparative Example 4 |
| --- | --- | --- | --- | --- |
| Resin Characteristics |  |  |  |  |
| $C_2''$ Content (wt. %) | 7.5 | 6.9 | 8.2 | 7.0 |
| MI (g/10 min) | 5.6 | 6.5 | 5.2 | 6.0 |
| Boiling Diethyl Ether | 1.9 | 1.5 | 1.7 | 3.6 |

TABLE 4-continued

|  | Example 5 | Example 6 | Example 7 | Comparative Example 4 |
|---|---|---|---|---|
| Extraction (wt. %) |  |  |  |  |
| Melting Point (° C.) | 115.1 | 119.0 | 112.2 | 121.0 |
| Isotactic Triad Fraction (mol %) | 94.5 | 98.6 | 98.3 | 95.8 |
| PEP Chain Moiety (mol %) | 9.2 | 9.0 | 9.5 | 3.9 |
| Film Quality |  |  |  |  |
| Heat-sealing Temperature (° C.) | 104 | 107 | 101 | 127 |
| Anti-blocking Characteristic (N/m²) | 38 | 27 | 34 | 100< |
| Slipping Characteristic(tanθ) | 0.11 | 0.15 | 0.14 | 0.35 |
| Haze (%) | 1.6 | 1.9 | 1.8 | whitened to be cloudy |
| Impact Resistance (film impact) (KJ/m) | 22 | 20 | 23 | 22 |

(C) Multi-layered Films Comprising Propylenic Random Copolymer (A) and Propylenic Random Copolymer (C)

EXAMPLE 8

[1] Propylenic Random Copolymer (A)

A propylenic random copolymer (A) was produced in the same manner as in Example 1, except that the ethylene concentration and the hydrogen concentration in the reactor were 2.4 mol % and 5.5 mol %, respectively, in the polymerization step (4).

[2] Propylenic Random Copolymer (C)

A propylenic random copolymer (C) was produced in the same manner as in Example 1, except that the ethylene concentration and the hydrogen concentration in the reactor were 0.7 mol % and 3.4 mol %, respectively, in the polymerization step (4).

The resin characteristics of those copolymers (A) and (C) were evaluated according to the methods (A) mentioned above. Using those copolymers (A) and (C), a multi-layered films having the layer constitution (a) was formed according to the method (B) mentioned above. The quality of the multi-layered film was evaluated according to the methods (C) mentioned above. The data obtained are shown in Table 5 below.

EXAMPLE 9

A multi-layered film was formed in the same manner as in Example 8, except that the film had the layer constitution (b) of the method (B). The quality of the multi-layered film formed herein was evaluated according to the methods (C) mentioned above. The data obtained are shown in Table 5.

EXAMPLE 10

A propylenic random copolymer (A) was produced in the same manner as in Example 8-[1], except that the ethylene concentration and the hydrogen concentration in the reactor were 2.9 mol % and 5.6 mol %, respectively, in the polymerization step.

A propylenic random copolymer (C) was produced in the same manner as in Example 8-[2], except that the ethylene concentration and the hydrogen concentration in the reactor were 1.2 mol % and 4.3 mol %, respectively, in the polymerization step.

The resin characteristics of those copolymers (A) and (C) were evaluated according to the methods (A) mentioned above. Using those copolymers (A) and (C), a multi-layered film having the layer constitution (a) was formed according to the method (B) mentioned above. The quality of the multi-layered film was evaluated according to the methods (C) mentioned above. The data obtained are shown in Table 5.

EXAMPLE 11

A multi-layered film was formed in the same manner as in Example 10, except that the film had the layer constitution (b) of the method (B). The quality of the multi-layered film formed herein was evaluated according to the methods (C) mentioned above. The data obtained are shown in Table 5.

Comparative Example 5

A propylenic random copolymer was produced in the same manner as in Example 8-[2], except that diethyl phthalate was used in place of di-n-butyl phthalate, that cyclohexylmethyldimethoxysilane was used in place of dicyclopentyldimethoxysilane, and that the ethylene concentration and the hydrogen concentration in the reactor were 1.5 mol % and 3.5 mol %, respectively, in the polymerization system. Using this copolymer in place of the propylenic random copolymer (C) in Example 8-[2], a multi-layered film was formed in the same manner as in Example 8. The quality of the multi-layered film formed herein was evaluated according to the methods (C) mentioned above. The data obtained are shown in Table 6 below.

Comparative Example 6

A multi-layered film was formed in the same manner as in Comparative Example 5, except that the film had the layer constitution (b) of the method (B). The quality of the multi-layered film formed herein was evaluated according to the methods (C) mentioned above. The data obtained are shown in Table 6.

Comparative Example 7

A propylene homopolymer was produced in the same manner as in Example 8-[1], except that diethyl phthalate was used in place of di-n-butyl phthalate, that cyclohexylmethyldimethoxysilane was used in place of dicyclopentyldimethoxysilane, and that propylene was homopolymerized in the absence of ethylene while 0.1 mmols/kg-PP of cyclohexylmethyldimethoxysilane was fed into the polymerization system. Using this propylene homopolymer in place of the propylenic random copolymer (C) in Example 8-[2], a multi-layered film was formed in the same manner as in Example 8. The quality of the multi-layered film formed herein was evaluated according to the methods (C) mentioned above. The data obtained are shown in Table 6 below.

Comparative Example 8

A multi-layered film was formed in the same manner as in Comparative Example 7, except that the film had the layer constitution (b) of the method (B). The quality of the multi-layered film formed herein was evaluated according to the methods (C) mentioned above. The data obtained are shown in Table 6.

Comparative Example 9

A propylenic random copolymer was produced in the same manner as in Example 8-[2], except that diethyl phthalate was used in place of di-n-butyl phthalate, that cyclohexylmethyldimethoxysilane was used in place of dicyclopentyldimethoxysilane, and that the ethylene concentration and the hydrogen concentration in the reactor were 2.6 mol % and 3.3 mol %, respectively, in the polymerization system. Using this copolymer in place of the propylenic random copolymer (A) in Example 8-[1], a multi-layered film was formed in the same manner as in Example 8. The quality of the multi-layered film formed herein was evaluated according to the methods (C) mentioned above. The data obtained are shown in Table 6 below.

Comparative Example 10

A multi-layered film was formed in the same manner as in Comparative Example 9, except that the film had the layer constitution (b) of the method (B). The quality of the multi-layered film formed herein was evaluated according to the methods (C) mentioned above. The data obtained are shown in Table 6.

TABLE 5

| Layer Constitution | Example 8 1/5/1 | Example 9 1/10/1 | Example 10 1/5/1 | Example 11 1/10/1 |
|---|---|---|---|---|
| Copolymer A | | | | |
| Ethylene Content (wt. %) | 4.4 | 4.4 | 4.9 | 4.9 |
| MI (g/10 min) | 5.3 | 5.3 | 5.4 | 5.4 |
| Boiling Diethyl Ether Extraction (wt. %) | 2.0 | 2.0 | 2.0 | 2.0 |
| Melting Point (° C.) | 132.9 | 132.9 | 131.0 | 131.0 |
| Isotactic Triad Fraction (mol %) | 99.1 | 99.1 | 99.0 | 99.0 |
| Copolymer C | | | | |
| Ethylene Content (wt. %) | 1.0 | 1.0 | 1.9 | 1.9 |
| MI (g/10 min) | 7.0 | 7.0 | 8.5 | 8.5 |
| Boiling Diethyl Ether Extraction (wt. %) | 1.0 | 1.0 | 1.1 | 1.1 |
| Melting Point (° C.) | 155.5 | 155.5 | 150.6 | 150.6 |
| Isotactic Triad Fraction (mol %) | 99.1 | 99.1 | 99.2 | 99.2 |
| Time of Relaxation, τ (sec) | 0.377 | 0.377 | 0.341 | 0.341 |
| Quality of Laminate Film | | | | |
| Heat-sealing Temperature (° C) | 125 | 126 | 121 | 121 |
| Modulus of Tensile Elasticity (Mpa) | 1030 | 1120 | 950 | 1000 |
| Anti-blocking Characteristic (N/m²) | | | | |
| treated/treated | 35 | 34 | 43 | 38 |
| non-treated/non-treated | 16 | 16 | 32 | 30 |
| Slipping Characteristic (tanθ) | | | | |
| treated/treated | 0.09 | 0.10 | 0.08 | 0.07 |
| non-treated/non-treated | 0.11 | 0.12 | 0.12 | 0.12 |
| Haze (%) | 3.3 | 3.1 | 3.2 | 2.9 |
| Impact Resistance (film impact) (KJ/m) | 14 | 13 | 14 | 14 |

TABLE 6

| Layer Constitution | Comparative Example 5 1/5/1 | Comparative Example 6 1/10/1 | Comparative Example 7 1/5/1 | Comparative Example 8 1/10/1 | Comparative Example 9 1/5/1 | Comparative Example 10 1/10/1 |
|---|---|---|---|---|---|---|
| Copolymer B | | | | | | |
| Ethylene Content (wt. %) | 4.4 | 4.4 | 4.4 | 4.4 | | |
| MI (g/10 min) | 5.3 | 5.3 | 5.3 | 5.3 | | |
| Boiling Diethyl Ether Extraction (wt. %) | 2.0 | 2.0 | 2.0 | 2.0 | | |
| Melting Point (° C.) | 132.9 | 132.9 | 132.9 | 132.9 | | |
| Isotactic Triad Fraction (mol %) | 99.1 | 99.1 | 99.1 | 99.1 | | |
| Copolymer A | | | | | | |
| Ethylene Content (wt. %) | 2.2 | 2.2 | 0.0 | 0.0 | 4.4 | 4.4 |
| MI (g/10 min) | 9.0 | 9.0 | 6.9 | 6.9 | 8.5 | 8.5 |

TABLE 6-continued

| Layer Constitution | Comparative Example 5 1/5/1 | Comparative Example 6 1/10/1 | Comparative Example 7 1/5/1 | Comparative Example 8 1/10/1 | Comparative Example 9 1/5/1 | Comparative Example 10 1/10/1 |
|---|---|---|---|---|---|---|
| Boiling Diethyl Ether Extraction (wt. %) | 2.3 | 2.3 | 1.7 | 1.7 | 3.0 | 3.0 |
| Melting Point (° C.) | 149.0 | 149.0 | 161.7 | 161.7 | 132.9 | 132.9 |
| Isotactic Triad Fraction (mol %) | 97.0 | 97.0 | 96.1 | 96.1 | 97.0 | 97.0 |
| Time of Relaxation, τ (sec) | 0.344 | 0.344 | 0.447 | 0.447 | | |
| Quality of Laminate Film | | | | | | |
| Heat-sealing Temperature (° C.) | 125 | 126 | 126 | 130 | 138 | 138 |
| Modulus of Tensile Elasticity (Mpa) | 710 | 700 | 940 | 970 | 1020 | 1090 |
| Anti-blocking Characteristic (N/m$^2$) | | | | | | |
| treated/treated | 52 | 54 | 40 | 39 | 100 or more | 100 or more |
| non-treated/non-treated | 38 | 40 | 22 | 20 | 100 or more | 100 or more |
| Slipping Characteristic (tanθ) | | | | | | |
| treated/treated | 0.12 | 0.13 | 0.08 | 0.09 | 0.42 | 0.39 |
| non-treated/non-treated | 0.15 | 0.16 | 0.13 | 0.12 | 0.39 | 0.41 |
| Haze (%) | 3.2 | 3.3 | 3.1 | 3.4 | whitened to be cloudy | whitened to be cloudy |
| Impact Resistance (film impact) (KJ/m) | 12 | 15 | 14 | 13 | 15 | 14 |
| Copolymer C | | | | | | |
| Ethylene Content (wt. %) | | | | | 1.0 | 1.0 |
| MI (g/10 min) | | | | | 7.0 | 7.0 |
| Boiling Diethyl Ether Extraction (wt. %) | | | | | 1.0 | 1.0 |
| Melting Point (° C.) | | | | | 155.5 | 155.5 |
| Isotactic Triad Fraction (mol %) | | | | | 99.1 | 99.1 |
| Time of Relaxation, τ (sec) | | | | | 0.377 | 0.377 |

(D) Multi-layered Films Comprising Propylenic Random Copolymer (B) and Propylenic Random Copolymer (C):

EXAMPLE 12

[1] Propylenic Random Copolymer (B)

A propylenic random copolymer (B) was produced in the same manner as in Example 5.

[2] Propylenic Random Copolymer (C)

A propylenic random copolymer (C) was produced in the same manner as in Example 8.

The resin characteristics of those copolymers (A) and (C) were evaluated according to the same methods as in Example 8. The data obtained are shown in Table 7 below.

EXAMPLE 13

A multi-layered film was formed in the same manner as in Example 12, except that the film had the layer constitution (b) of the method (B). The quality of the multi-layered film formed herein was evaluated according to the methods (C) mentioned above. The data obtained are shown in Table 7.

Comparative Example 11

A propylenic random copolymer was produced in the same manner as in Example 12-[2], except that diethyl phthalate was used in place of di-n-butyl phthalate, that cyclohexylmethyldimethoxysilane was used in place of dicyclopentyldimethoxysilane, and that the ethylene concentration and the hydrogen concentration in the reactor were 1.5 mol % and 3.5 mol %, respectively, in the polymerization system. Using this copolymer in place of the propylenic random copolymer (C) in Example 12-[2], a multi-layered film was formed in the same manner as in Example 12. The quality of the multi-layered film formed herein was evaluated according to the methods (C) mentioned above. The data obtained are shown in Table 8 below.

Comparative Example 12

A multi-layered film was formed in the same manner as in Comparative Example 11, except that the film had the layer constitution (b) of the method (B). The quality of the multi-layered film formed herein was evaluated according to the methods (C) mentioned above. The data obtained are shown in Table 8.

Comparative Example 13

A propylene homopolymer was produced in the same manner as in Example 12-[2], except that diethyl phthalate was used in place of di-n-butyl phthalate, that cyclohexylmethyldimethoxysilane was used in place of dicyclopentyldimethoxysilane, and that propylene was homopolymerized in the absence of ethylene while 0.1 mmols/kg-PP of cyclohexylmethyldimethoxysilane was fed into the polymerization system. Using this propylene homopolymer in place of the propylenic random copolymer (C) in Example 12-[2], a multi-layered film was formed in the same manner as in Example 12. The quality of the multi-layered film formed herein was evaluated according to the methods (C) mentioned above. The data obtained are shown in Table 8 below.

Comparative Example 14

A multi-layered film was formed in the same manner as in Comparative Example 13, except that the film had the layer constitution (b) of the method (B). The quality of the multi-layered film formed herein was evaluated according to the methods (C) mentioned above. The data obtained are shown in Table 8.

Comparative Example 15

A propylenic random copolymer was produced in the same manner as in Comparative Example 4. Using this copolymer in place of the propylenic random copolymer (C) in Example 12-[2], a multi-layered film was formed in the same manner as in Example 12. The quality of the multi-layered film formed herein was evaluated according to the methods (C) mentioned above. The data obtained are shown in Table 8 below.

Comparative Example 16

A multi-layered film was formed in the same manner as in Comparative Example 15, except that the film had the layer constitution (b) of the method (B). The quality of the multi-layered film formed herein was evaluated according to the methods (C) mentioned above. The data obtained are shown in Table 8.

TABLE 7

| Layer Constitution | Example 12 1/5/1 | Example 13 1/10/1 |
|---|---|---|
| Copolymer B | | |
| Ethylene Content (wt. %) | 7.5 | 7.5 |
| MI (g/10 min) | 5.6 | 5.6 |
| Boiling Diethyl Ether Extraction (wt. %) | 1.9 | 1.9 |
| Melting Point (° C.) | 115.1 | 115.1 |
| Isotactic Triad Fraction (mol %) | 94.5 | 94.5 |
| PEP Chain Moiety (mol %) | 9.2 | 9.2 |
| Copolymer C | | |
| Ethylene Content (wt. %) | 1.0 | 1.0 |
| MI (g/10 min) | 7.0 | 7.0 |
| Boiling Diethyl Ether Extraction (wt. %) | 1.0 | 1.0 |
| Melting Point (° C.) | 155.5 | 155.5 |
| Isotactic Triad Fraction (mol %) | 99.1 | 99.1 |
| Time of Relaxation, $\tau$ (sec) | 0.377 | 0.377 |
| Quality of Laminate Film | | |
| Heat-sealing Temperature (° C.) | 105 | 104 |
| Modulus of Tensile Elasticity (Mpa) | 990 | 1040 |
| Anti-blocking Characteristic ($N/m^2$) | | |
| treated/treated | 39 | 37 |
| Non-treated/non-treated | 17 | 18 |
| Slipping Characteristic ($\tan\theta$) | | |
| treated/treated | 0.12 | 0.14 |
| non-treated/non-treated | 0.11 | 0.12 |
| Haze (%) | 3.2 | 3.3 |
| Impact Resistance (film impact) (KJ/m) | 15 | 15 |

TABLE 8

| | Comparative Example 11 1/5/1 | Comparative Example 12 1/10/1 | Comparative Example 13 1/5/1 | Comparative Example 14 1/10/1 | Comparative Example 16 1/5/1 | Comparative Example 15 1/10/1 |
|---|---|---|---|---|---|---|
| Layer Constitution | | | | | | |
| Copolymer B | | | | | | |
| Ethylene Content (wt. %) | 7.5 | 7.5 | 7.5 | 7.5 | 7.0 | 7.0 |
| MI (g/10 min) | 5.6 | 5.6 | 5.6 | 5.6 | 6.0 | 6.0 |
| Boiling Diethyl Ether Extraction (wt. %) | 1.9 | 1.9 | 1.9 | 1.9 | 3.6 | 3.6 |
| Melting Point (° C.) | 115.1 | 115.1 | 115.1 | 115.1 | 121.0 | 121.0 |
| Isotactic Triad Fraction (mol %) | 94.5 | 94.5 | 94.5 | 94.5 | 95.8 | 95.8 |

TABLE 8-continued

| Layer Constitution | Comparative Example 11 1/5/1 | Comparative Example 12 1/10/1 | Comparative Example 13 1/5/1 | Comparative Example 14 1/10/1 | Comparative Example 16 1/5/1 | Comparative Example 15 1/10/1 |
|---|---|---|---|---|---|---|
| Time of Relaxation, τ (sec) Copolymer C | 9.2 | 9.2 | 9.2 | 9.2 | 3.9 | 3.9 |
| Ethylene Content (wt. %) | 2.2 | 2.2 | 0.0 | 0.0 | 1.0 | 1.0 |
| MI (g/10 min) | 9.0 | 9.0 | 6.9 | 6.9 | 7.0 | 7.0 |
| Boiling Diethyl Ether Extraction (wt. %) | 2.3 | 2.3 | 1.7 | 1.7 | 1.0 | 1.0 |
| Melting Point (° C.) | 149.0 | 149.0 | 161.7 | 161.7 | 155.5 | 155.5 |
| Isotactic Triad Fraction (mol %) | 97.0 | 97.0 | 96.1 | 96.1 | 99.1 | 99.1 |
| Time of Relaxation, τ (sec) Quality of Laminate Film | 0.344 | 0.344 | 0.447 | 0.447 | 0.377 | 0.377 |
| Heat-sealing Temperature (° C.) | 105 | 105 | 106 | 112 | 128 | 130 |
| Modulus of Tensile Elasticity (Mpa) Anti-blocking Characteristic (N/m²) | 640 | 650 | 930 | 980 | 1030 | 1040 |
| treated/treated | 53 | 56 | 39 | 79 | 100 or more | 100 or more |
| non-treated/non-treated Slipping Characteristic (tanθ) | 34 | 38 | 24 | 20 | 100 or more | 100 or more |
| treated/treated | 0.16 | 0.15 | 0.08 | 0.10 | 0.45 | 0.40 |
| non-treated/non-treated | 0.14 | 0.17 | 0.09 | 0.09 | 0.41 | 0.43 |
| Haze (%) | 3.3 | 3.1 | 3.1 | 3.4 | whitened to be cloudy | Whitened to be cloudy |
| Impact Resistance (film impact) (KJ/m) | 14 | 15 | 13 | 14 | 15 | 14 |

As has been mentioned in detail hereinabove, the film of the propylenic copolymer of the invention has good heat-sealability, high stiffness, good anti-blocking and slipping properties, and high transparency without interfering with the intrinsic good characteristics of polypropylene films. Even when the copolymer is sheeted into films at a high sheeting speed, the quality of the films formed is worsened little. Accordingly, the copolymer of the invention is favorably used to form single-layered films and also to form sealant layers in laminate films to be formed through lamination or co-extrusion.

The multi-layered film comprising the propylenic random copolymer of the invention has high crystallinity and high stiffness. The multi-layered film comprises a substrate layer having meltability at low-temperature in some degree, and a sealant layer formed on at least one surface of the substrate layer, in which the sealant layer has good heat-sealability at low-temperature, and good anti-blocking and slipping properties. Therefore, the multi-layered film has high stiffness and good heat-sealability at low-temperature that are well balanced to each other, while having high impact resistance, good anti-blocking and slipping properties and high transparency, and is superior to any conventional polyproplenic laminate films.

In the invention, it is unnecessary to use α-olefins having 4 or more carbon atoms, such as 1-butene. The ethylene-propylene binary random copolymer of the invention can be sheeted into high-quality films having good properties such as those mentioned hereinabove. The monomer costs in the invention are low. In addition, since the copolymer of the invention has favorable characteristics, it can also be used to form a substrate layer in laminate films.

While the invention has been described in detail and with reference to specific embodiments thereof, it will be apparent to one skilled in the art that various changes and modifications can be made therein without departing from the spirit and scope thereof.

What is claimed is:

1. A multi-layered film of propylenic random copolymers, which comprises a surface layer of the following propylenic copolymer (A) as formed on at least one surface of a substrate layer of the following propylenic random copolymer (C), the thickness ratio of the surface layer to the substrate layer being from 0.005:1 to 0.5:1:

propylenic random copolymer (C) satisfying the following criteria (15) to (17):

(15) the ethylene unit content ($x_c$, wt. %) of the copolymer (C) is from 0.2 to 4 wt. %,

(16) the relation between the boiling diethyl ether extraction ($E_c$, wt. %) of the copolymer (C) and $x_c$ satisfies the following equation (XII):

$$E_c \leq 0.25 x_c + 1.1 \qquad \text{(XII)},$$

and

(17) the relation between the melting point (Tmc, ° C.) of the copolymer (C) as measured with a differential scanning calorimeter and xc satisfies the following equation (XIII):

$$Tmc \leq 165-5xc \qquad (XIII),$$

propylenic random copolymer (A) satisfying the following criteria (1) to (3):

(1) the ethylene unit content (xa, wt. %) of the copolymer (A) is from 3 to 10 wt. %, (2) the relation between the boiling diethyl ether extraction (Ea, wt. %) of the copolymer (A) and xa satisfies the following equations (I) or (II):

$$Ea \leq 0.25xa+1.1(xa=3 \text{ to } 6 \text{ wt. \%}) \qquad (I)$$

$$Ea \leq 2.6(xa=6 \text{ to } 10 \text{ wt. \%}) \qquad (II),$$

and (3) the relation between the melting point (Tmc, ° C.) of the copolymer (A) as measured with a differential scanning calorimeter and xa satisfies the following equations (III) or (IV):

$$Tmc \leq 140(xa=3 \text{ to } 5 \text{ wt. \%}) \qquad (III)$$

$$Tmc \leq 165-5xa(xa=5 \text{ to } 10 \text{ wt. \%}) \qquad (IV).$$

2. The multi-layered film of propylenic random copolymers as claimed in claim 1, in which the surface layer of the propylenic random copolymer (A) further satisfies the following criteria (4) and (5):

(4) the copolymer (A) has a melt index (MIc, g/10 min) of from 4 to 12 g/10 min. and (5) the isotactic triad fraction (mmc, mol %) in the PPP sequence of the copolymer (A), as measured in $^{13}$C-NMR, is not smaller than 98.0 mol %.

3. The multi-layered film of propylenic random copolymers as claimed in claim 1, in which the substrate layer of the propylenic random copolymer (C) further satisfies the following criteria (18) and (19):

(18) the copolymer (C) has a melt index (MIc, g/10 min) of from 4 to 12 g/10 min. and

(19) the isotactic triad fraction (mmc, mol %) in the PPP sequence of the copolymer (C), as measured in $^{13}$C-NMR, is not smaller than 98 mol %.

4. The multi-layered film of propylenic random copolymers as claimed in claim 2, in which the substrate layer of the propylenic random copolymer (C) further satisfies the following criteria (18) and (19):

(18) the copolymer (C) has a melt index (MIc, g/10 min) of from 4 to 12 g/10 min. and

(19) the isotactic triad fraction (mmc, mol %) in the PPP sequence of the copolymer (C), as measured in $^{13}$C-NMR, is not smaller than 98 mol %.

5. A multi-layered film of propylenic random copolymers, which comprises a surface layer of the following propylenic copolymer (B) as formed on at least one surface of a substrate layer of the following propylenic random copolymer (C), the thickness ratio of the surface layer to the substrate layer being from 0.005:1 to 0.5:1:

propylenic random copolymer (C) satisfying the following criteria (15) to (17):

(15) the ethylene unit content (xc, wt. %) of the copolymer (C) is from 0.2 to 4 wt. %,

(16) the relation between the boiling diethyl ether extraction (Ec, wt. %) of the copolymer (C) and xc satisfies the following equation (XII):

$$Ec \leq 0.25xc+1.1 \qquad (XII),$$

and

(17) the relation between the melting point (Tmc, ° C.) of the copolymer (C) as measured with a differential scanning calorimeter and xc satisfies the following equation (XIII):

$$Tmc \leq 165-5xc \qquad (XIII),$$

propylenic random copolymer (B) satisfying the following criteria (9) to (11):

(9) the ethylene unit content (xb, wt. %) of the copolymer (B) is from 0.2 to 15 wt. %,

(10) the relation between the boiling diethyl ether extraction (Eb, wt. %) of the copolymer (B) and xb satisfies the following equations (VII) or (VIII):

$$Eb \leq 0.2xb+1.0(0.2 \leq xb<5) \qquad (VII)$$

$$Eb \leq 2.0(5 \leq xb \leq 15) \qquad (VIII),$$

and

(11) the relation between the melting point (Tmb, ° C.) of the copolymer (B) as measured with a differential scanning calorimeter and xb satisfies the following equations (IX) or (X):

$$Tmb \leq 140(0.2 \leq xb<4) \qquad (IX)$$

$$Tmb \leq 160-5xb(4 \leq xb \leq 15) \qquad (X).$$

6. The multi-layered film of propylenic random copolymers as claimed in claim 5, in which the surface layer of the propylenic random copolymer (B) further satisfies the following criteria (12) to (14):

(12) the copolymer (B) has a melt index (MIb, g/10 min) of from 0.1 to 15 g/10 min.,

(13) the isotactic triad fraction (mmb, mol %) in the PPP sequence of the copolymer (B), as measured in $^{13}$C-NMR, is not smaller than 90 mol %., and

(14) the relation between the PEP sequence content (R, mol %) of the copolymer (B) as measured in $^{13}$C-NMR, and xb satisfies the following equation (XI):

$$R \geq 0.5xb+1.0 \qquad (XI).$$

7. The multi-layered film of propylenic random copolymers as claimed in claim 5, in which the substrate layer of the propylenic random copolymer (C) further satisfies the following criteria (18) and (19):

(18) the copolymer (C) has a melt index (MIc, g/10 min) of from 4 to 12 g/10 min. and

(19) the isotactic triad fraction (mmc, mol %) in the PPP sequence of the copolymer (C), as measured in $^{13}$C-NMR, is not smaller than 98 mol %.

8. The multi-layered film of propylenic random copolymers as claimed in claim 6, in which the substrate layer of the propylenic random copolymer (C) further satisfies the following criteria (18) and (19):

(18) the copolymer (C) has a melt index (MIc, g/10 min) of from 4 to 12 g/10 min. and

(19) the isotactic triad fraction (mmc, mol %) in the PPP sequence of the copolymer (C), as measured in $^{13}$C-NMR, is not smaller than 98 mol %.

9. The multi-layered film of propylenic random copolymers as claimed in claim 1, in which the propylenic random copolymer (C) further satisfies the following criterion (20):

(20) the relation between the melt index (MIc, g/10 min) of the copolymer (C) and the time of relaxation ($\tau$, sec) of the copolymer (C) as obtained through frequency dispersion measurement at a frequency $\omega_0 = 10^0$ rad/sec satisfies the following equation (XIV):

$$\tau \leq 0.65 - 0.025 MIc \qquad (XIV).$$

* * * * *